(12) United States Patent
Chung

(10) Patent No.: US 8,050,726 B2
(45) Date of Patent: *Nov. 1, 2011

(54) SLIDING MECHANISM AND PORTABLE ELECTRONIC DEVICE USING THE SAME

(75) Inventor: Huan-Chang Chung, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 1150 days.

This patent is subject to a terminal disclaimer.

(21) Appl. No.: 11/726,903

(22) Filed: Mar. 23, 2007

(65) Prior Publication Data
US 2008/0073196 A1 Mar. 27, 2008

(30) Foreign Application Priority Data
Sep. 27, 2006 (CN) .......................... 2006 1 0062825

(51) Int. Cl.
*H04M 1/00* (2006.01)
(52) U.S. Cl. ............. 455/575.1; 455/550.1; 379/428.01; 379/433.01
(58) Field of Classification Search ............... 455/575.1; 379/330, 428.01
See application file for complete search history.

(56) References Cited

U.S. PATENT DOCUMENTS

| 7,542,788 | B2* | 6/2009 | Lee ............................. 455/575.4 |
| 2005/0197173 | A1* | 9/2005 | Wee et al. .................. 455/575.4 |
| 2006/0142073 | A1* | 6/2006 | Gordecki ................... 455/575.4 |
| 2007/0270180 | A1* | 11/2007 | Takagi ....................... 455/550.1 |

FOREIGN PATENT DOCUMENTS

WO 2005020452 A1 3/2005

* cited by examiner

*Primary Examiner* — Lester Kincaid
*Assistant Examiner* — Isaak R Jama
(74) *Attorney, Agent, or Firm* — Altis Law Group, Inc.

(57) ABSTRACT

A sliding mechanism (100) for use in a portable electronic device (500) is provided. The sliding mechanism includes a first plate (10), a second plate (20), a plurality of limiting structures (17), and a linkage module (30). The second plate is longitudinally slidably connected with the first plate. The limiting structures are secured on/to the first plate for limiting a position of the second plate with respect to the first plate. The linkage module is positioned between the first plate and the second plate and connects the first plate and the second plate. The linkage module particularly includes an elastic unit (34). The elastic unit is able to store spring energy that can be used to drive the linkage module. Specifically, such spring energy enables the second plate to automatically slide along the first plate after the second plate is manually moved an initial amount.

13 Claims, 8 Drawing Sheets

SLIDING MECHANISM AND PORTABLE ELECTRONIC DEVICE USING THE SAME

CROSS-REFERENCE TO RELATED APPLICATIONS

This application is related to a co-pending U.S. patent application Ser. No. 11/726901 entitled "SLIDING MECHANISM AND PORTABLE ELECTRONIC DEVICE USING THE SAME" by Huan-Chang Chung et al. Such application has the same assignee as the instant application and has been concurrently filed herewith. The disclosure of the above-identified application is incorporated herein by reference.

BACKGROUND OF THE INVENTION

1. Field of the Invention

The present invention relates to sliding mechanisms and, particularly, to a portable electronic device with two or more housings configured with a sliding mechanism such that one housing is allowed to slide with respect to another housing in a longitudinal direction.

2. Description of related art

Portable electronic devices have been increasingly widely used with a multiplicity of functions. A mobile telephone terminal is exemplified as a portable electronic device that provides wireless communication services to its subscriber while wirelessly communicating with its base station. Rapid development in the field of information and telecommunication business has made it possible for mobile users to use a variety of functions and types of mobile phones available on the market. These mobile telephone terminals are generally classified into three or more types of terminals, such as, e.g., a bar-type terminal, a flip-type terminal with a flip cover, and a foldable terminal with a folding mechanism adapted to be opened and closed about a main body at a given angle.

The bar-type terminal is generally formed with a single body housing so that various data input/output means and a receiver and transmitter set are arranged on the housing, and a keypad assembly utilized as a data input/output means is fully exposed. Thus, a bar-type terminal may suffer from error due to careless manipulation by its user, and its design requires a relatively long distance between the receiver set and the transmitter set, which may lead to serious limitations in making the terminal smaller.

The folding-type or foldable terminal generally incorporates a main body, a folding portion, and a hinge module for coupling the main body and the folding portion, so that rotation of the folding portion allows opening or closure of the folding portion with respect to the main body. The main body is provided with a data input/output means, such as, for example, a keypad and a receiver set. Thus, when the folding portion is in the closed state on the main body and the terminal is, effectively, in a standby mode, the terminal can prevent any undesired operation error or malfunction since the folding portion is adapted to fully cover the keypad. However, in a telephone mode, the folding portion is usually rotated away from the main body of the mobile phone to ensure that there is enough distance between the receiver and the transmitter of the phone. As a result of this ability to fold, the design of this type of terminal may be made much smaller, at least for storage purposes. As such, mobile users recently have preferred foldable terminals to any other type of mobile communication terminals.

When using flip-type or foldable terminals, the hinge module rotatably couples the flip member or the folding portion with the main body. The hinge module operates in such a manner that when the flip or folding portion of the mobile terminal is opened to rotate up to a specified threshold angle about the main body, a continuous acting force is generated by the hinge module and is applied in the direction of opening, without application of additional external force by a user. Meanwhile, when the flip or folding portion of the mobile terminal is rotated during closing below a specified threshold angle about the main body, a continuous acting force is generated by the hinge module and is applied in the direction of closure, without application of more force by the user.

In the meantime, as more diverse design concepts are introduced in the design of mobile communication terminals, a sliding type of mobile terminal has recently become widely used. The sliding-type design typically includes two housings in which one housing is slidably opened or closed with respect to the other housing. However, these sliding type mobile terminals do not yet offer a variety of different designs, and for this reason, its users may feel some inconvenience in that they have to manually slide one housing with respect to the other housing in order to open or close it.

What is needed, therefore, is a sliding mechanism for use in a portable electronic device (e.g., a mobile phone terminal) that can overcome the above-mentioned shortcomings.

SUMMARY OF THE INVENTION

In one embodiment thereof, a sliding mechanism for use in a portable electronic device is provided. The sliding mechanism includes a first plate, a second plate, a plurality of limiting structures, and a linkage module. The second plate is longitudinally slidably connected with the first plate. The plurality of limiting structures is secured on/to the first plate and each is configured (i.e., structured and arranged) for limiting a position of the second plate with respect to the first plate. The linkage module is positioned between the first plate and the second plate and connects the first plate and the second plate. The linkage module particularly includes an elastic unit. The elastic unit is able to store spring energy that can be used to drive the linkage module. That spring energy, upon release thereof, enables the second plate to automatically slide along the first plate after the second plate is firstly manually moved through a predetermined range of length with respect to the first plate.

A portable electronic device is provided and includes a first housing, a second housing, the above sliding mechanism, and a fixing means. The second housing is longitudinally slidably connected with the first housing. The sliding mechanism is configured to drive the second housing to slide with respect to the first housing. The fixing means is configured to fix the first and second plates to the sliding mechanism.

Other advantages and novel features will become more apparent from the following detailed description when taken in conjunction with the accompanying drawings.

BRIEF DESCRIPTION OF THE DRAWINGS

Many aspects of the sliding mechanism and portable electronic device using the same can be better understood with reference to the following drawings. These drawings are not necessarily drawn to scale, the emphasis instead being placed upon clearly illustrating the principles of the present sliding mechanism and portable electronic device using the same. Moreover, in the drawings like reference numerals designate corresponding parts throughout the several views.

DETAILED DESCRIPTION OF PREFERRED EMBODIMENTS

The present sliding mechanism is suitable for portable electronic devices, such as mobile phone terminals, digital cameras, and so on.

Figure 1:
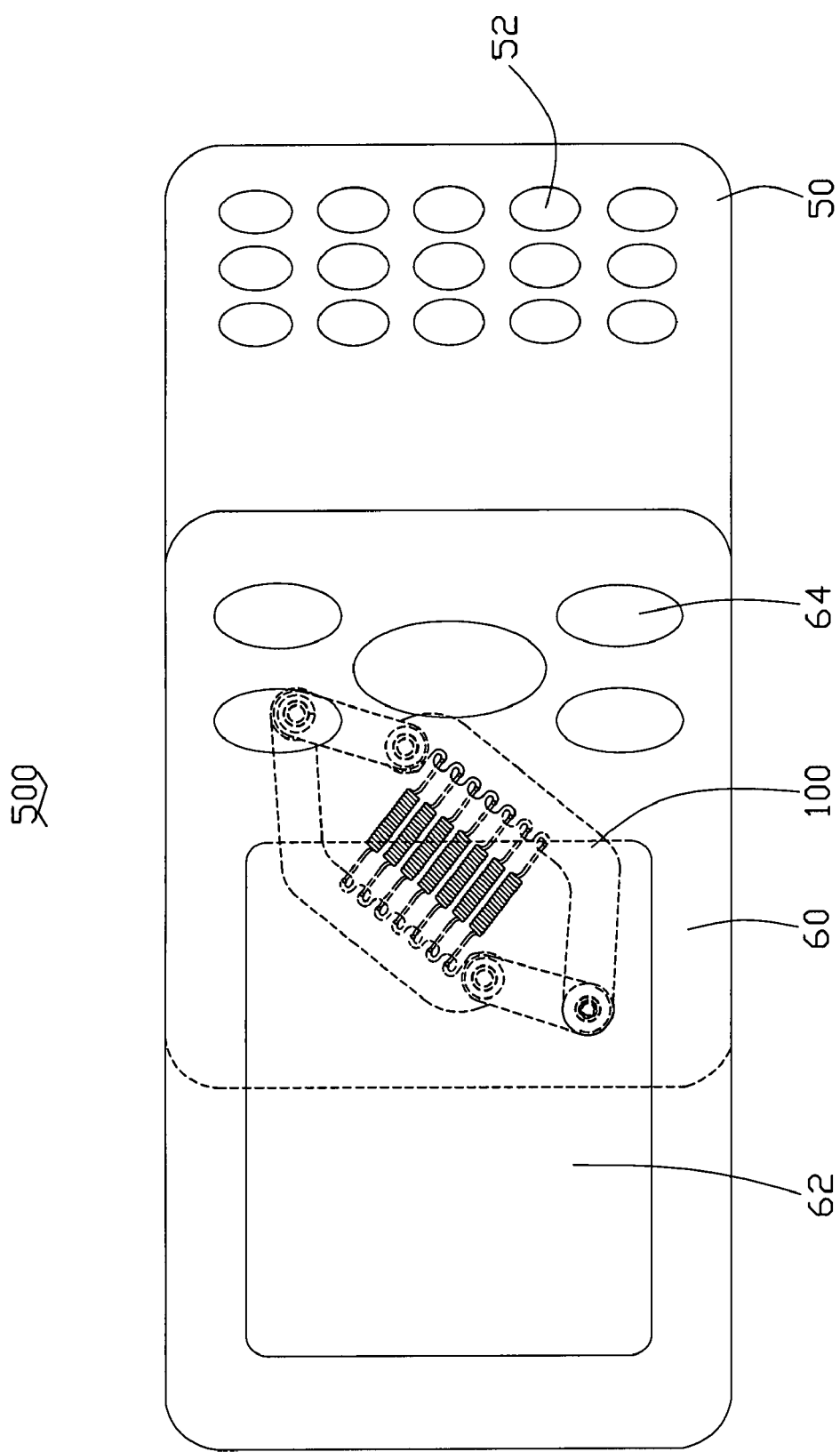
FIG. 1 is an isometric view of a mobile phone terminal incorporating a sliding mechanism, in accordance with a preferred embodiment.

Referring to the drawings in detail, FIG. 1 shows an exemplary preferred mobile phone terminal 500 installed with a sliding mechanism 100. The mobile phone terminal 500 includes a first housing 50 and a second housing 60. The second housing 60 is oriented face-to-face with the first housing 50 and is slidably movable with respect thereto, due to the sliding mechanism 100. Advantageously, as illustrated, the first housing 50 is provided with a keypad section 52 facing towards the second housing 60, and the second housing 60 is equipped with a display unit 62 and function key section 64 on an outside thereof. When the mobile phone terminal 500 is in a standby state, the keypad section 52 is protected within the second housing 60. Once the sliding mechanism 100 enables the second housing 60 to slide relative to the first housing 50, the keypad section 52 is exposed and is made available for use.

Figure 2:
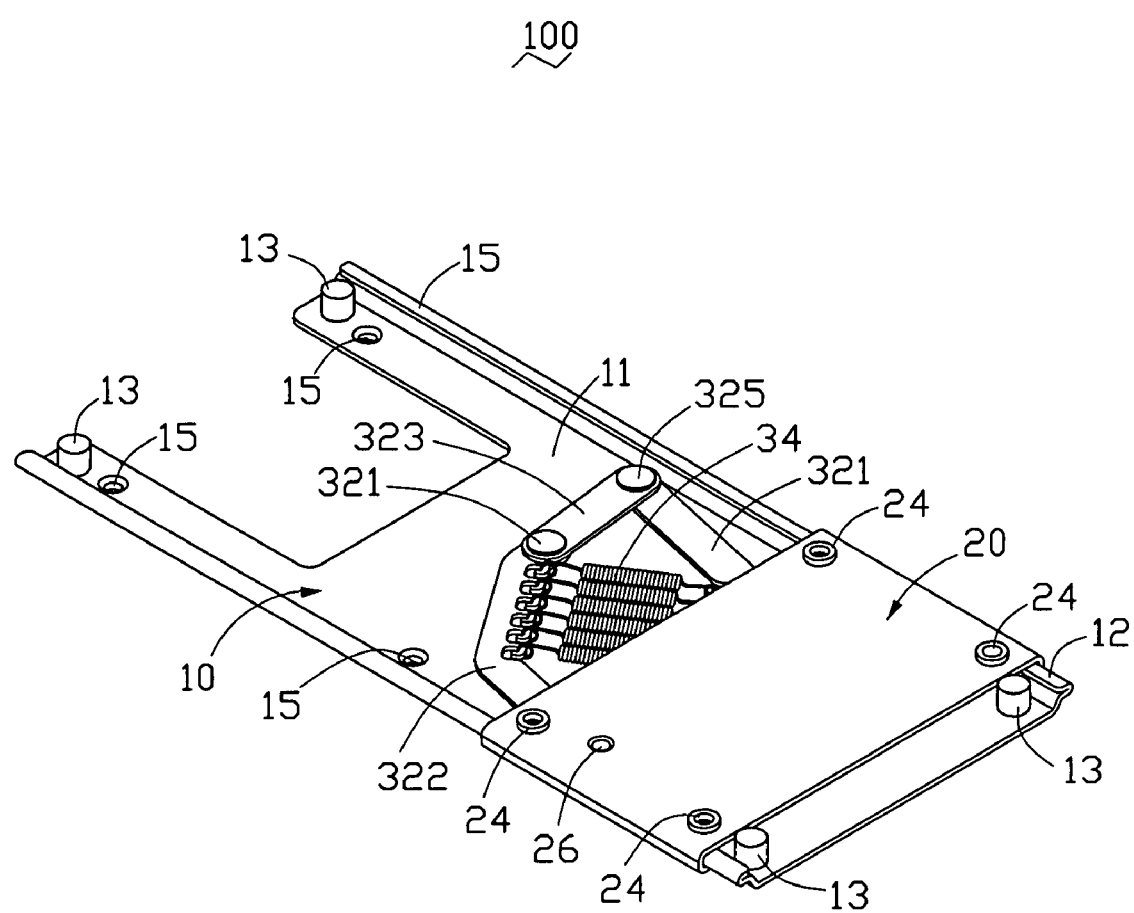
FIG. 2 is an enlarged, isometric view of the sliding mechanism shown in FIG. 1.
Figure 3:
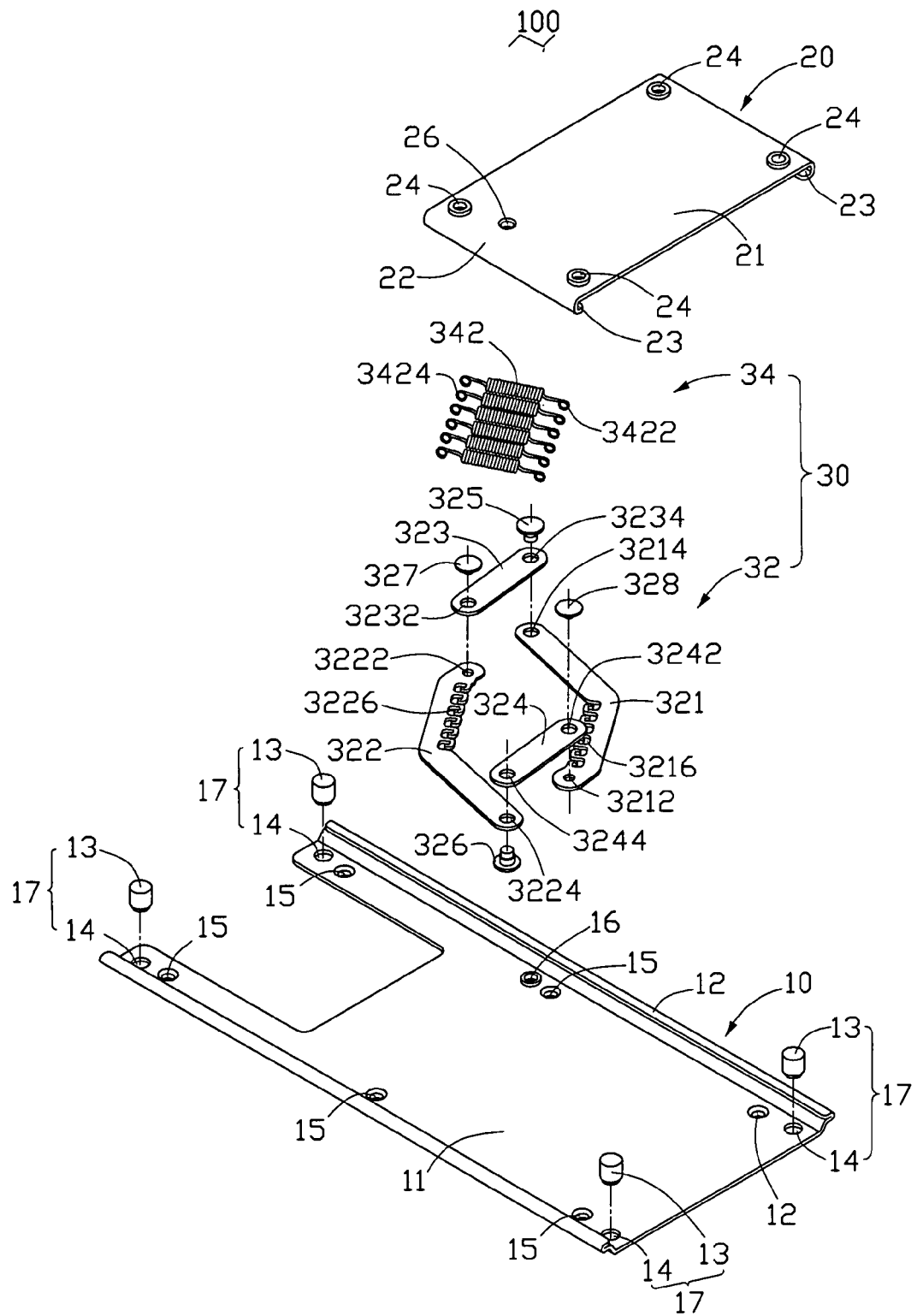
FIG. 3 is an exploded, isometric view of the sliding mechanism shown in FIG. 2.

Referring now to FIGS. 2 and 3, the sliding mechanism 100 includes a first plate 10, a second plate 20, and a linkage module 30. The linkage module 30 links the first plate 10 and the second plate 20 and drives the second plate 20 to slide smoothly along the first plate 10. The first plate 10 is fixed to the first housing 50 of the mobile phone terminal 500, and the second plate 20 is attached to the second housing 60 of the mobile phone terminal 500.

Referring to FIG. 3 in detail, the first plate 10 of the sliding mechanism 100 is generally rectangular and includes a main body 11, two guide rails 12, and four limiting portions 13. The two guide rails 12, respectively, extend directly and upwardly from the two opposed, relatively long sides of the main body 11. Each limiting portion 13 is preferably a cylindrical column with a thread formed thereon. The main body 11 has four limiting holes 14, a plurality of first fixing holes 15, and a first engaging hole 16 defined therethrough. The four limiting holes 14 correspond to the four limiting portions 13 and are preferably screw holes.

Each limiting portion 13 and its corresponding limiting hole 14 cooperatively form a limiting structure 17, which functions to limit the position (more specifically, the potential range of movement) of the second plate 20 relative to the first plate 10. The limiting structures 17 are disposed at one end of the first plate 10, and a distance between adjacent limiting portions 13, along the guide rails 12, depends upon a given sliding length/distance of the second housing 60 of the mobile phone terminal 500 relative to the first housing 50 thereof. The first fixing holes 15 are used to facilitate the fixing of the first plate 10 to the first housing 50 of the mobile phone terminal 500. The first fixing holes 15 are preferably six screw holes, which are arranged and distributed evenly along/adjacent the two relatively long sides (three on each side, with one at each end and the third centrally positioned, per side) of the main body 11. The first engaging hole 16 is defined at the middle, longitudinally, of the main body 11 and is positioned adjacent to one guide rail 12.

An end of a given limiting portion 13 is threadably inserted and thus attached within the limiting hole 14 corresponding thereto. It is to be understood that a given limiting portion 13 could be fixably attached, alternatively or additionally, within a given hole 14 using an adhesive or via a metallurgical connection (e.g., welding or soldering). Appropriate elements can, likewise, be attached, as needed, within other holes (e.g., 15, 16) of the sliding mechanism 100 by any of, e.g., screw-threading, adhesive, and/or metallurgical means.

The second plate 20 of the sliding mechanism 100 (shown in FIG. 3) is generally rectangular sheet-shaped. A first end/side 21 thereof has a similar length as that of a shorter side of the above first plate 10. Two second ends/sides 22 extend directly and perpendicularly from opposed sides of the first end 21. The two second ends 22 are provided with two respective guide grooves 23. The two guide grooves 23 are positioned corresponding to the guide rails 12 of the first plate 10, and, thus, the second plate 20 can slide along the first plate 10, with the guide rails 12 engaging in the guide grooves 23.

The second plate 20 has a plurality of second fixing holes 24 and a second engaging hole 26 defined therethrough. The plurality of second fixing holes 24 is used to facilitate the fixing of the second plate 20 to the second housing 60 of the mobile phone terminal 500. The second fixing holes 24 are preferably four screw holes, which are arranged and distributed evenly on the four corners of the first plate 10. The second engaging hole 26 is defined at the middle, longitudinally, of the first plate 10 and is positioned adjacent to one guide groove 23 and one second fixing hole 24.

The linkage module 30 includes a linking unit 32 and an elastic unit 34, the elastic unit 34 being secured within the linking unit 32 and urging the linking unit 32 to change a configuration/alignment thereof, due to the spring force that is able to be stored and released thereby.

The linking unit 32 includes a first curved connecting bar 321, a second curved connecting bar 322, a first linking board 323, a second linking board 324, a first positioning member 325, a second positioning member 326, a first connecting member 327, and a second connecting member 328. The first and second curved connecting bars 321-322 and the first and second linking boards 323-324 are preferably sheet-shaped. By such parts 321-324 being sheet-shaped, the overall thickness of the linking unit 32 can be minimized. Accordingly, it is easier to incorporate the linking unit 32, ultimately, within the body of the mobile phone terminal 500. The first curved connecting bar 321 has a substantially similar size and shape to that of the second curved connecting bar 322, and the first linking board 323 is essentially identical to the second linking board 324, in shape and size. The first curved connecting bar 321 has a first connecting hole 3212 and a third engaging hole 3214 defined through two respective end portions and have a plurality of first hooked portions 3216 formed on one sidewall of one half thereof. The first hooked portions 3216 are arranged and positioned linearly along the one sidewall.

The second curved connecting bar 322 is configured in manner juxtaposed to the first curved connecting bar 321. A second connecting hole 3222 and a fourth engaging hole 3224 are defined through two respective end portions of the second curved connecting bar 322. One half portion of the second curved connecting bar 322 further has a plurality of second hooked portions 3226 formed linearly along a side thereof.

The first linking board 323 defines a third connecting hole 3232 corresponding to the second connecting hole 3222 of the second curved connecting bar 322 and defines a fifth engaging hole 3234 corresponding to the third engaging hole 3214 of the first curved connecting bar 321. The second linking board 324 has a fourth connecting hole 3242 and a sixth engaging hole 3244 formed therethrough. The fourth connecting hole 3242 corresponds to the first connecting hole 3212 of the first curved connecting bar 321, and the sixth engaging hole 3244 corresponds to fourth engaging hole 3224 of the second curved connecting bar 322.

The first and second positioning members 325-326 and the first and second connecting members 327-328 function to integrate the first and second connecting bars 321-322 and the first and second linking boards 323-324, as a whole, and further provide the entirety of the assembly with rotational freedom. The first positioning member 325 is preferably a pin and is essentially structured and dimensioned (i.e., configured) for insertion through and, thereby, engagement with the first engaging hole 16 of the first plate 10, the third engaging hole 3214 of the first curved connecting bar 321, and the fifth engaging hole 3234 of the first linking board 323. The first connecting bar 321 may rotate freely around the first linking board 323 by means of the first positioning member 325.

The second positioning member 326 is also preferably a pin and is configured to insertably engage with the second engaging hole 26 of the second plate 20, the fourth engaging hole 3224 of the second curved connecting bar 322, and the sixth engaging hole 3244 of the second linking board 324. The second connecting bar 322 is able to rotate freely around the second linking board 324 by means of the second positioning member 326. The first connecting member 327 is preferably a pin corresponding to the first connecting hole 3212 of the first connecting bar 321 and the fourth connecting hole 3242 of the second linking board 324. The second connecting member 328 is preferably a pin corresponding to the second connecting hole 3222 of the second connecting bar 322 and the third connecting hole 3232 of the first linking board 323. Thus, the first and second connecting bars 321-322 are allowed to rotate freely around the first and second linking board 323-324 via the first and second connecting members 327-328.

The elastic unit 34 is a unit of a plurality of elastic members 342 corresponding to the first and second hooked portions 3216, 3226. The elastic members 342 are preferably coil springs, each of which is provided with a first latch hook 3422 and a second latch hook 3424 on the respective ends thereof. The first and second latch hooks 3422-3424 are configured and dimensioned to hook with the first and second hooked portions 3216, 3226, respectively. It is to be understood, however, that the elastic members 342 could, instead, take the form of another spring type or could be elastomeric elements.

Referring also to FIG. 2, in assembly of the sliding mechanism 100, the first linking board 323 is rotably connected to the second connecting bar 322 by means of the second connecting member 328 engaging with the third connecting hole 3232 of the first linking board 323 and the second connecting hole 3222 of the second connecting bar 322. The second linking board 324 is also freely attached to the first connecting bar 321, with the first connecting member 327 engaging the fourth connecting hole 3242 of the second linking board 324 and the first connecting hole 3212 of the first connecting bar 321.

The first linking board 323 is further positioned and rotably connected to the first connecting bar 321 and the first plate 10 of the sliding mechanism 100. In particular, the first positioning member 325 engages with the third engaging hole 3214 of the first connecting bar 321, the fifth engaging hole 3234 of the first linking board 323, and the first engaging hole 16 of the first plate 10. Thus, the first connecting bar 321 connects the first linking board 323 and can rotate around the second linking board 324 through a certain angle.

Each elastic member 342 of the elastic unit 34 then links the first and second connecting bars 321-322 with two latch hooks 3422-3424 thereof, hooking with the respective first and second hooked portions 3216, 3226 of the first and second connecting bars 321 -322.

Then, the second plate 20 of the sliding mechanism 100 connects with the first plate 10 by the two guide rails 12 of the first plate 10 operatively fitting into the two respective guide grooves 23. The second plate 20 is further positioned with the second engaging hole 26 thereof, aligning with the sixth engaging hole 3244 of the second linking board 324. Thus, the linking unit 32 and the elastic unit 34 are located between the first plate 10 and the second plate 20.

Then, the second positioning member 326 is inserted through the fourth engaging hole 3224 of the second connecting bar 322, the sixth engaging hole 3244 of the second linking board 324, and the second engaging hole 26 of the second plate 20. As such, the second connecting bar 322 connects the second linking board 324 and can rotate around the second linking board 324 through a certain angle. The limiting portions 13 are respectively rotably secured into the limiting holes 14. After that, the sliding mechanism 100 is totally assembled, with the elastic unit 34 between the first and second connecting bars 321-322 and the limiting portions 13 resisting movement of the second plate 20 from the first plate 10.

The first and second housings 50, 60 of the mobile phone terminal 500 are firmly secured with the first and second plates 10, 20 at a certain original position via a first and second fixing holes 15, 24. In this case, the mobile phone terminal 500 may be opened or closed. Referring now to FIG. 1, in this embodiment, the mobile phone terminal 500 is preferably opened with the second housing 60 displaced to the first housing 50 and the keypad section 52 being exposed.

Figure 4:
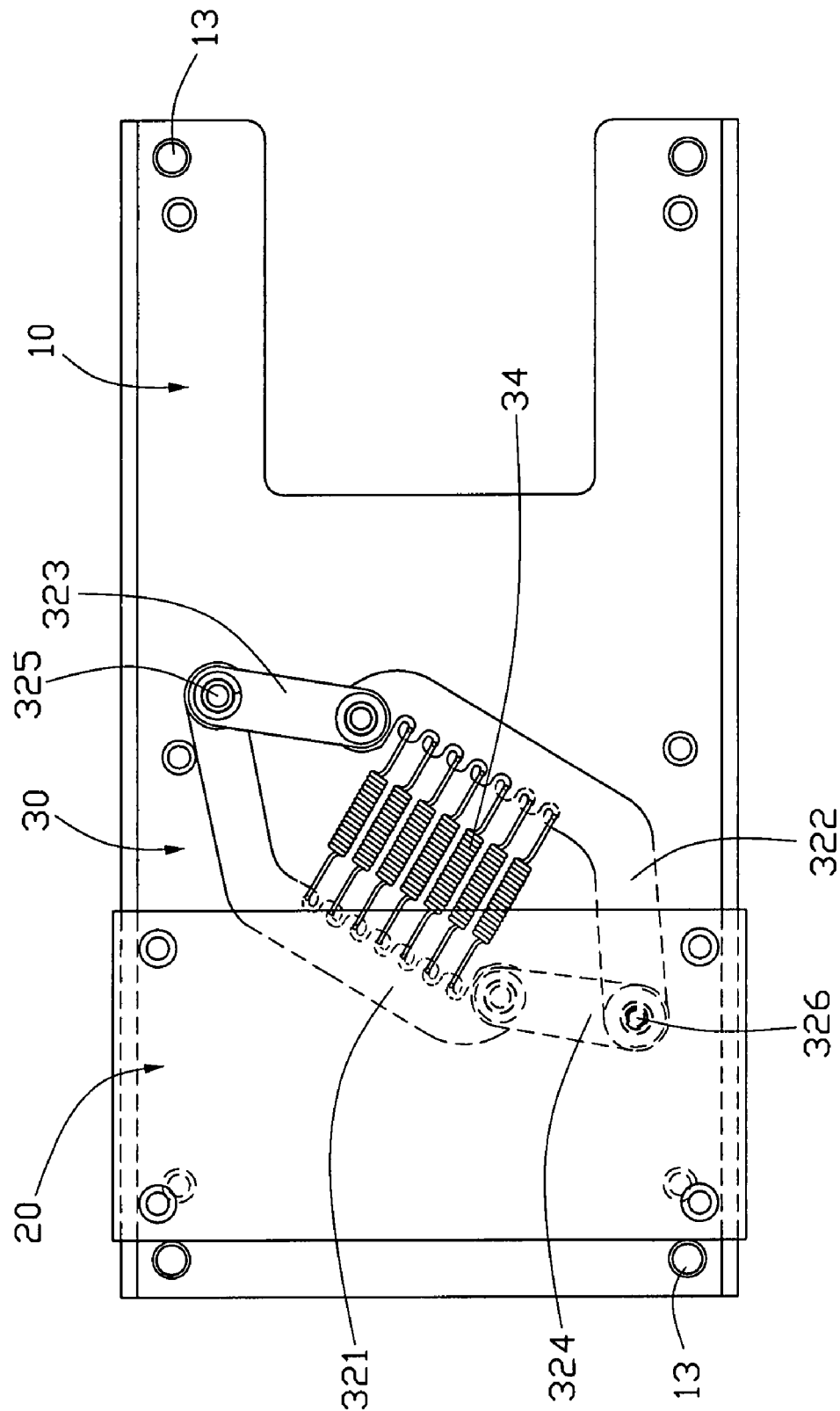
FIG. 4 is a top view of the sliding mechanism shown in FIG. 2.

In use, FIG. 4 through FIG. 8 illustrate the operation of the sliding mechanism 100, which corresponds to the transfer of the opened state of the mobile phone terminal 500 to the closed state thereof. FIG. 4 shows an original state of the sliding mechanism 100. In this case, the mobile phone terminal 500 is in an open state. As such, the elastic unit 34 of the sliding mechanism 100 is biased to enable the first linking board 323 to be essentially parallel to the second linking board 324. At this point, the first and second connecting bars 321-322 are partially covered by the second plate 20.

Figure 5:
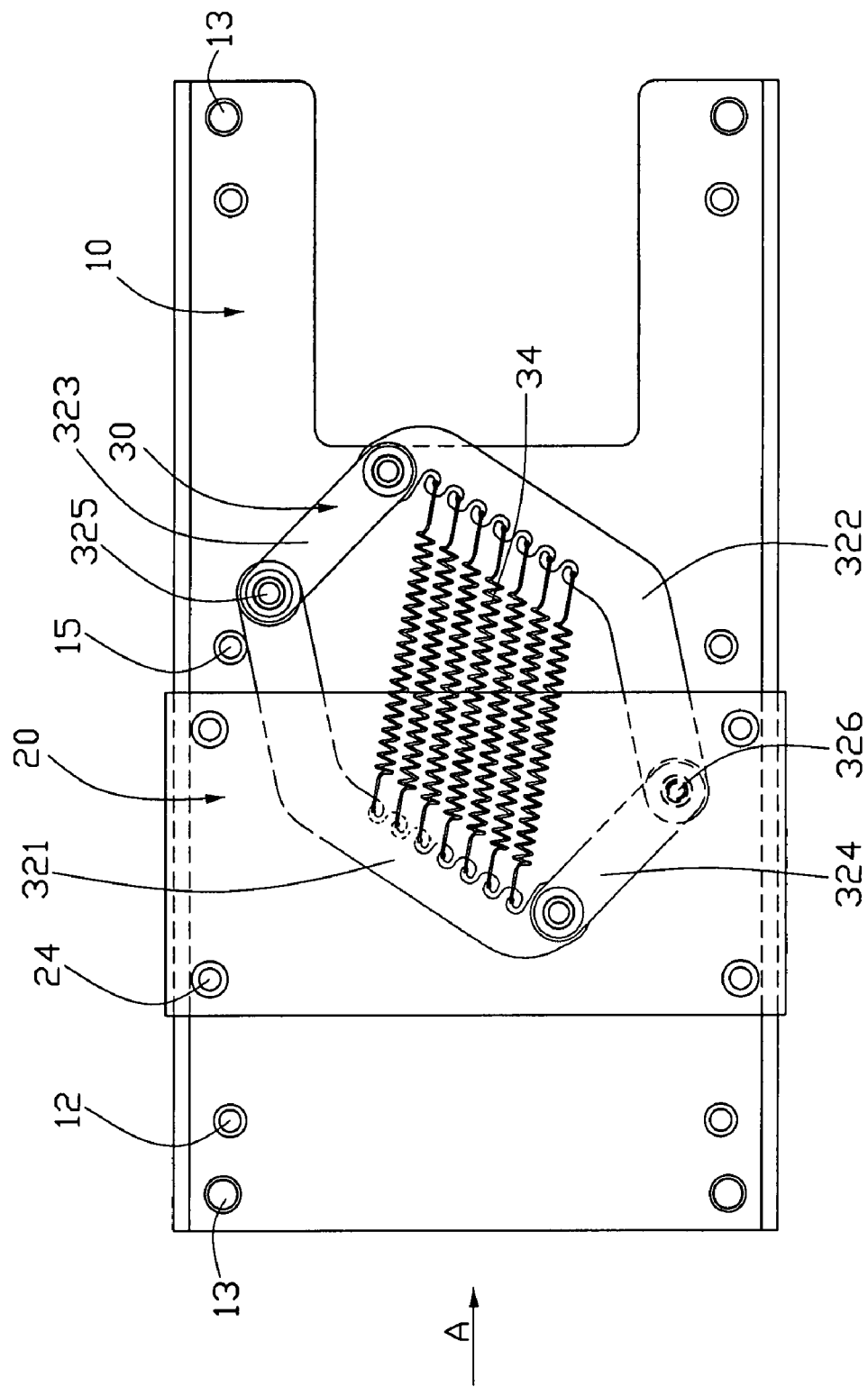
FIGS. 5 through 8 show a series of top views of the sliding mechanism shown in FIG. 4, corresponding to an opening/closure operation of the mobile phone terminal shown in FIG. 1.
Figure 6:
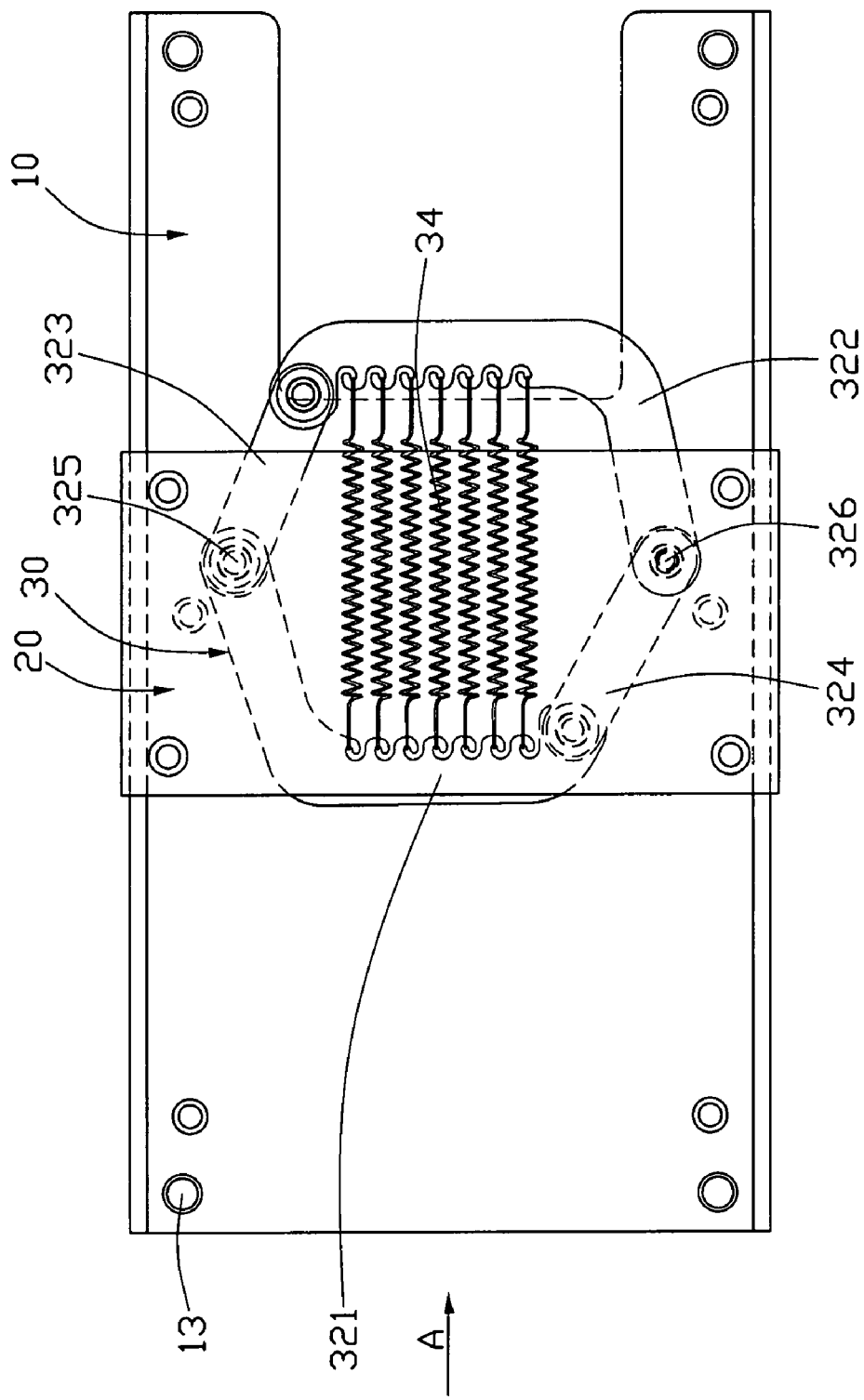

FIG. 5 shows an "A" line, which indicates an operating direction of the sliding mechanism 100. When the second plate 20 of sliding mechanism 100 is urged along the line A by an external force, the second plate 20 is moved along the first plate 10 with the guide rails 12 of the first plate 10 sliding with respect to the first plate 10. At this time, the external force overcomes the biasing force of the elastic unit 34 and enables the first and connecting bars to rotate in an counterclockwise direction to approach the first plate 10. As the second plate 20 is moved further away from the first plate 10, a stronger biasing force of the elastic unit 34 is provided. Referring now to FIG. 6, when the second plate 20 reaches a specific position where each elastic member 342 of the elastic unit 34 is located parallel with the guide rails 12, the elastic unit 34 achieves maximum biasing force.

Figure 7:
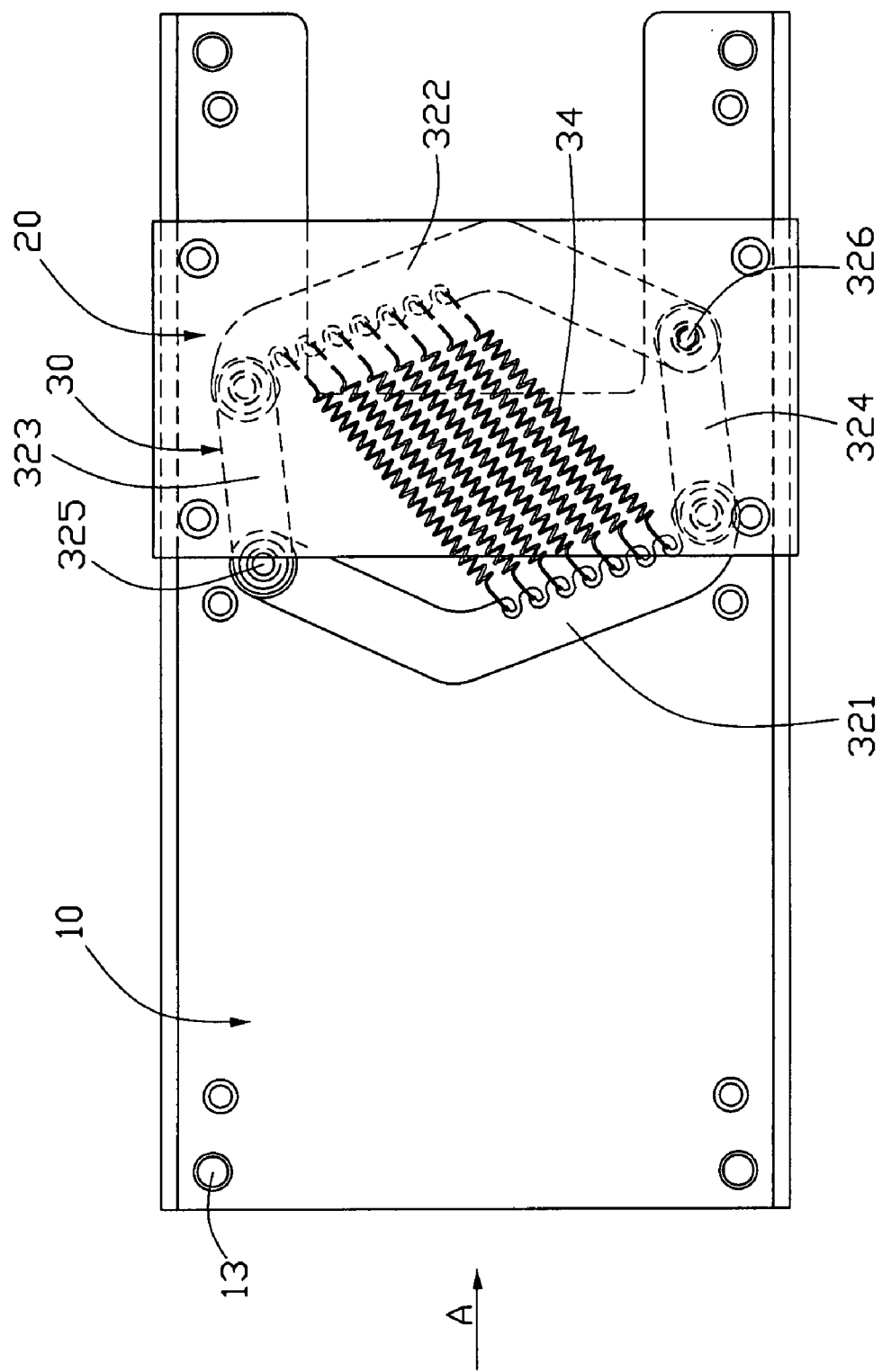

Then, referring to FIG. 7, once the second plate 20 moves a further distance, the external force is not needed and the biasing force of the elastic unit 34 can urge the second plate 20 to move freely along the first plate 10. As such, the elastic unit 34 is released so as to drive the second housing 60 of the mobile phone terminal 500 to slide freely towards the first housing 50 thereof, and the mobile phone terminal 500 can be closed automatically. During this process, the first and second connecting bars 321-322 are further rotated in the anticlockwise direction.

Figure 8:
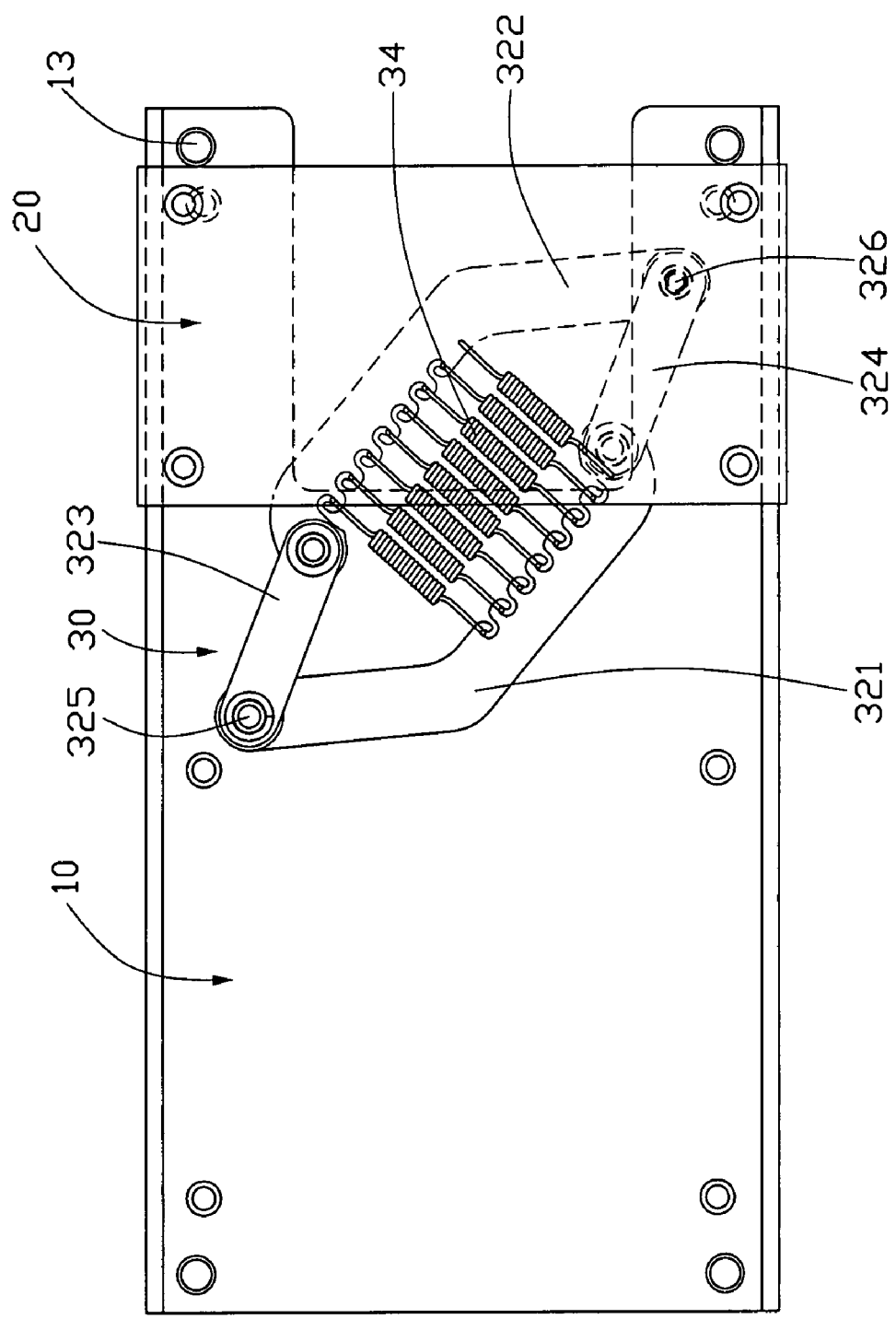

FIG. 8 shows the mobile phone terminal 500 in a closed state. In FIG. 8, the elastic unit 34 is restored to its original state, and the second plate 20 is moved from original position, limited by one limiting portion 13 (best shown in FIG. 4) to another position blocked by the other limiting portion 13 (best shown in FIG. 8). In this case, the mobile phone terminal 500 is in a closed state with the keypad section 52 thereof being enclosed by the second housing 60.

When there is a need to reopen the mobile phone terminal 500, an external force is enforced in a new direction opposite to the A line to drive the second plate 20 to slide back along the first plate 10. During this process, the external force overcomes the increasing biasing force of the expanded elastic unit 34 so as to enable the first and second connecting bars 321-322 to again rotate in a clockwise direction.

When the biasing force of the elastic unit 34 reaches a maximized extent, the external force can be removed, and the energy stored in the elastic unit 34 is able to release to allow the first and second connecting bars 321-322 to automatically rotate back to original state. Thus, the second plate 20 slides with respect to the first plate 10 until the second plate 20 is blocked and stopped by the limiting portions 13 again. As such, referring to FIG. 4, the sliding mechanism 100 restores to original state, and the mobile phone terminal 500 is reopened with the keypad section 52 thereof being exposed again.

Therefore, the above sliding mechanism 100 and the above portable electronic device (e.g., mobile phone terminal 500) using the same are so configured (i.e., structured and arranged), so as to implement a semi-automatic sliding opening/closure of the second housing 60 thereof. That is, the present sliding mechanism allows a user to control the opening and closure operations with greater ease and convenience. In particular, the linkage module 30 is able to store energy in the elastic unit 34, energy that effectively can be used to facilitate semi-automatic opening and closing of the present sliding mechanism 100. Also, the quad-linkage (i.e., collapsible parallelogram) construction of the linkage module 30 promotes smooth and steady operation of the present sliding mechanism 100.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A sliding mechanism, comprising:
   a first plate comprising a main body and two opposite guide rails, the two guide rails extending along the main body;
   a second plate comprising two guide grooves and longitudinally slidably connected to the first plate by a slidable engagement of the guide rails in the guide grooves;
   a plurality of limiting structures secured to the first plate, each limiting structure being configured for limiting a potential range of movement of the second plate relative to the first plate; and
   a linkage module being positioned between the first plate and the second plate and connecting the first plate and the second plate, the linkage module including an elastic unit and a linking unit, the elastic unit comprising a plurality of parallel coil springs, each coil spring having two ends, each end secured to an opposite portion of the linking unit, the linking unit defining a closed hexagon enclosing the plurality of coil springs and collapsible with the sliding of the first plate relative to the second plate, simultaneously driving the coil springs and the elastic unit to longitudinally extend or retract, the refraction beginning after maximum extension achieved, driving the linkage module and enabling the second plate to automatically slide along the first plate after the second plate moves a predetermined range of length relative to the first plate.

2. The sliding mechanism as claimed in claim 1, wherein the linking unit comprises a first linking board, a second linking board, a first connecting bar, and a second connecting bar, the first linking board rotatably connects the first and second connecting bars, the second linking rotatably connects the first and second connecting bars, the first linking board is located facing the second linking board, and the first connecting bar is locating facing the second connecting bar.

3. The sliding mechanism as claimed in claim 2, wherein each coil spring includes respective first and second latch hooks, the respective first and second latch hooks are correspondingly formed at two opposing ends of a given elastic member, the first and second connecting bars each include a plurality of first and second hooked portions formed thereon, and the first and second hooked portions correspond to the first and second latch hooks, respectively.

4. The sliding mechanism as claimed in claim 2, wherein the linking unit further comprises a first positioning member, a second positioning member, a first connecting member, and a second connecting member, the first positioning member and the first connecting member are configured to rotatably couple the first linking board to the first and second connecting bars, and the second positioning member and the second connecting member are configured for rotatably coupling the second linking board to the first and second connecting bars.

5. The sliding mechanism as claimed in claim 4, wherein the first connecting bar includes a first connecting hole defined therethrough, the second linking board has a fourth connecting hole defined therethrough, and the first connecting hole corresponds to the fourth connecting hole and the second connecting member.

6. The sliding mechanism as claimed in claim 4, wherein the first plate includes a first engaging hole defined therethrough, the first connecting bar includes a third engaging hole defined therethrough, the first linking board has a fifth engaging hole defined therethrough, and the first engaging hole corresponds to the third engaging hole, the third engaging hole, and the first positioning member.

7. The sliding mechanism as claimed in claim 4, wherein the second plate includes a second engaging hole defined therethrough, the second connecting bar includes a fourth engaging hole defined therethrough, the second linking board has a sixth engaging hole defined therethrough, and the second engaging hole corresponds to the fourth engaging hole, the sixth engaging hole, and the second positioning member.

8. The sliding mechanism as claimed in claim 4, wherein the second connecting bar includes a second connecting hole defined therethrough, the first linking board has a third connecting hole defined therethrough, and the second connecting hole corresponds to the third connecting hole and the first connecting member.

9. The sliding mechanism as claimed in claim 1, wherein the limiting structures each comprise a limiting portion and a corresponding limiting hole, the first plate comprises a main body, the limiting holes are defined through the main body, and the limiting holes are respectively located at two opposite ends of the main body and correspond to the limiting portions, an end of a given limiting portion being inserted within a limiting hole corresponding thereto.

10. The sliding mechanism as claimed in claim 9, wherein the limiting portions are threadedly attached within the limiting holes.

11. A portable electronic device, comprising:
   a first housing;
   a second housing longitudinally slidably connected with the first housing; and
   a sliding mechanism configured to drive the second housing to slide relative to the first housing, the sliding mechanism comprising:
      a first plate comprising a main body and two opposite guide rails, the two guide rails extend along the main body, the first plate fixed to the first housing;
      a second plate comprising two guide grooves and longitudinally slidably connected with the first plate by a slidable engagement of the guide rails in the guide grooves, the second plate fixed to the second housing;
      a plurality of limiting structures being secured on the first plate for limiting a position of the second plate relative to the first plate; and
      a linkage module being positioned between the first plate and the second plate and connecting the first plate and the second plate, the linkage module including an elastic unit and a linking unit, the elastic unit comprising a plurality of parallel coil springs, each coil spring having two ends, each end secured to an opposite portion of the linking unit, the linking unit defining a closed hexagon enclosing the plurality of coil springs, and collapsible with the sliding of the first plate relative to the second plate, simultaneously driving the coil springs and the elastic unit to longitudinally extend or retract, the retraction beginning after maximum extension achieved, driving the linkage module and enabling the second plate to slide along the first plate after the second plate moves a predetermined range of length relative to the first plate; and
      a fixing structure for attaching the first and second plates to the sliding mechanism.

12. The portable electronic device as claimed in claim 11, wherein each limiting structure comprises a limiting portion and a limiting hole, a plurality of limiting holes are defined through the main body, and the limiting holes are respectively located at two opposite ends of the main body and correspond to the limiting portions.

13. The portable electronic device as claimed in claim 11, wherein the fixing structure comprises a plurality of first fixing holes and second fixing holes, the first fixing holes are defined through the main body, and the second fixing holes are defined through the second plate.

* * * * *